United States Patent Office 2,788,422
Patented Apr. 9, 1957

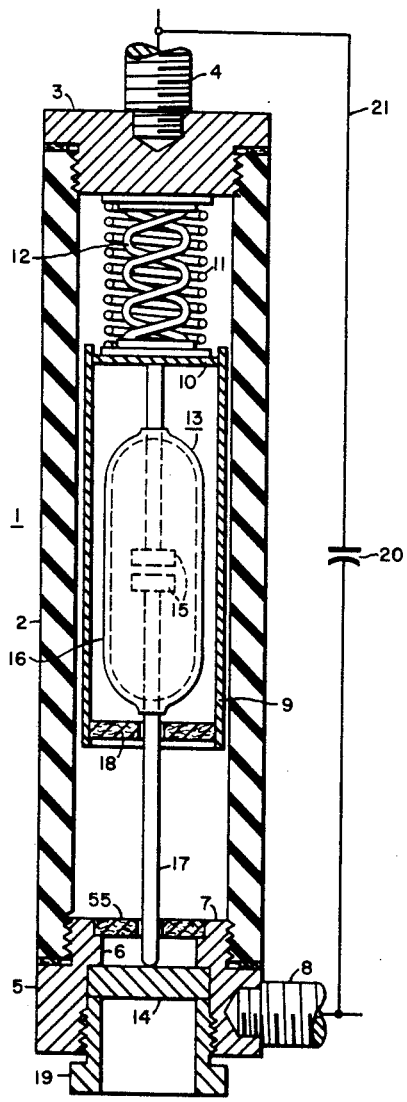

2,788,422
PROTECTIVE DEVICE FOR SERIES CAPACITORS

Ralph E. Marbury, Pittsburgh, Pa., assignor to Westinghouse Electric Corporation, East Pittsburgh, Pa., a corporation of Pennsylvania Application December 20, 1954, Serial No. 476,238

6 Claims. (Cl. 200—118)

The present invention relates to protective devices, and more particularly to a low cost device for the protection of series capacitors against overvoltage. This application is a continuation-in-part of my copending application, Serial No. 339,068, filed February 26, 1953, now abandoned.

Capacitors are frequently connected in series in distribution lines to neutralize part or all of the inductive reactance of the circuit, in order to improve the voltage regulation. Since such capacitors are connected in series in the line and carry the line current, the voltage across the capacitor is proportional to the line current, and very high voltages may occur in case of a fault on the line. It is not practical to use capacitors which are capable of withstanding the maximum voltage to which they may be subjected under fault conditions, because of the excessive cost, and some means of protection against overvoltage must, therefore, be provided. Since the capacitor must be protected substantially instantaneously upon the occurrence of an overvoltage, that is, within the first half-cycle of fault current, spark gaps are usually used for bypassing the capacitor.

Series capacitors installed in high-voltage transmission lines, and relatively large series capacitor banks installed in distribution lines, are usually protected by means of spark gaps connected across the capacitors and provided with means for extinguishing the arc in the gap at the proper time to restore the capacitor to service, or with means for bypassing the gap to extinguish the arc and for subsequently interrupting the bypass circuit to restore the capacitor to service.

Such protective systems are relatively expensive, however, and for this reason are not suitable for use with small, low voltage series capacitors such as may be used in low voltage distribution lines. Thus, it is often desirable to connect a capacitor in series in the primary of a distribution transformer supplying a distribution circuit in a residential area, for example, to prevent voltage fluctuations caused by starting of motors on the low voltage side of the transformer. Such an installation might consist of one, or possibly several, low voltage capacitor units, such as 230 volt units, for example, connected in series with the transformer primary. Since such an installation is relatively inexpensive, it is evident that the elaborate and expensive protective systems used with large series capacitor banks could not economically be utilized for the protection of these small series capacitors, because the cost of the protective system would be far out of proportion to the cost of the capacitors themselves. For this reason, small, low voltage series capacitors have not been considered practical heretofore although such installations would be very desirable in many cases.

The principal object of the present invention is to provide a reliable, low cost protective device suitable for the protection of relatively small series capacitors.

Another object of the invention is to provide a protective device suitable for the protection of series capacitors which reliably completes a bypass circuit around the capacitor upon the occurrence of a predetermined overvoltage, and which is capable of carrying the line current continuously until the device is replaced or reset.

A further object of the invention is to provide a protective device suitable for series capacitor protection consisting of contact members which are biased into engagement, but which are normally held apart by spacing means comprising a spark gap device and means responsive to current flow through the gap device which permits the contact members to move into engagement in response to arcing over of the gap, together with means for quickly and easily resetting the device after operation.

The invention will be more fully understood from the following detailed description, taken in connection with the accompanying drawing, in which:

Figure 1 is a longitudinal sectional view showing an illustrative embodiment of the invention;

Fig. 2 is a view in elevation showing the protective device mounted on a capacitor; and Fig. 3 is a longitudinal sectional view showing another embodiment of the invention.

Figure 1 of the drawing shows a protective device 1 embodying the invention, which is suitable for the protection of relatively low voltage capacitors. The protective device 1 is enclosed in a tubular insulating housing 2, which may be made of fiber or other suitable insulating material which is weather-resistant and has sufficient mechanical strength. The upper end of the housing 2 is closed by a metal cap 3, which may be threaded into the fiber housing 2 and which is provided with a terminal stud 4. A metal contact member 5 is threaded into the lower end of the housing 2 to close the lower end. The contact member 5 extends into the housing 2 and has a central opening 6 and an annular contact surface 7 within the housing. A terminal stud 8 may be mounted in the side of the contact member 5.

A movable contact member is provided within the housing 2. The movable contact member comprises a cylindrical copper contact member 9 which is closed at the top by a copper plate 10. The movable contact 9 is positioned within the housing to cooperate with the stationary contact 5, and a compression spring 11 engages the plate 10 of the movable contact and the inner side of the top cap member 3 to urge the contact member 9 into engagement with the stationary contact 5 to complete a circuit between the terminal studs 4 and 8. A shunt 12 is preferably connected between the cap 3 and the plate 10 so that the spring 11 is not utilized as a current-carrying member.

The contact members 9 and 5 are urged into engagement by the spring 11 but are normally held apart by spacing means in the housing 2. The spacing means includes a spark gap device 13 and a support member 14 supported on the stationary contact member 5. The gap device 13 may be any suitable type of spark gap which can be accurately adjusted for a relatively low breakdown voltage, and is shown as being of the sealed low-pressure type. Thus, the gap device 13 may consist of spaced electrodes 15 enclosed in a glass envelope 16, the ends of the electrodes extending through the envelope and being sealed in the glass. A gap of this type may be evacuated and filled with an inert gas, and the gas pressure and electrode spacing are adjusted to obtain the desired breakdown voltage, which should be of the order of 250 percent of the voltage rating of the capacitor to be protected. A suitable type of sealed gap device for this purpose is shown, for example, in my copending application, Serial No. 408,821, filed February 4, 1954, although any suitable gap construction may be utilized.

The gap device 13 is placed within the movable contact member 9 and its upper electrode engages the plate 10 at the top of the contact member. The lower electrode of the gap device has an elongated projecting portion 17 which extends through a fiber centering disc 18 in the movable contact member and engages the support member 14. The support member 14 is preferably a disc of resistance material and is supported in the central opening 6 of the stationary contact member 5. The resistance element or support member 14 is shown as being clamped against a shoulder in the central opening 6 by means of an annular retainer member 19, which is threaded in the contact member 5. A fiber guide disc 55 having a central opening may be provided at the top of the contact member 5 to guide the movement of the electrode portion 17.

The support member 14 is preferably a resistance element which is normally rigid and has sufficient strength to withstand the force of the spring 11, but which is adapted to yield, or lose its mechanical strength, in response to current flow through it. Thus, the resistance element 14 may be made of a thermoplastic material carrying a suitable amount of finely divided metal powder to give it the required conductivity. The resistance element 14 is preferably molded of polystyrene containing a relatively large amount of finely divided aluminum powder. Such a disc has sufficient conductivity to carry fault current and protect the capacitor, and when current flows through the disc it very rapidly softens, or loses its rigidity and mechanical strength, so that it yields or, if the current is sufficiently high, may disintegrate. Under normal conditions, however, when no current flows through the device, the resistance element 14 is rigid and has sufficient mechanical strength to support the gap device 13 in the position shown, so that the gap device and resistance element act as a spacing means to hold the contact members 5 and 9 apart against the force of the spring 11. It will be understood that, although a particular preferred material for the element 14 has been described, other suitable materials may be used which are capable of yielding or softening in response to current flow through the gap device.

In use, the protective device 1 is connected directly across a capacitor 20 which is to be protected. The capacitor 20 is shown as being connected in series in a line 21, which may, for example, be a relatively low voltage distribution line, and the capacitor 20 itself may be a relatively small, low voltage capacitor unit. Since the protective device 1 is small, it can readily be mounted on the capacitor itself, if desired. Thus, as shown in Fig. 2, the protective device 1 may be mounted directly on the terminals 22 of the capacitor 20 by means of copper strap members 23, which are mounted on the terminals 22 and engage the terminal studs 4 and 8 of the protective device 1, so that the device is connected directly across the capacitor. Terminal clamps 24 of any suitable type may be provided on the studs 4 and 8 for connection of the line leads.

During normal operation, the contact members 5 and 9 of the protective device 1 are held apart, as shown in Fig. 1 and described above, so that the protected capacitor is directly in series in the line. Upon the occurrence of a fault, or other excessive-current condition, on the line 21 which causes a voltage across the capacitor in excess of the breakdown voltage of the gap device 13, the gap will arc over and bypass the capacitor so that it is protected from the overvoltage. Current then flows from the terminal stud 4 through the gap device 13 and the resistance element 14 to the terminal stud 8. The flow of current through the resistance element 14, probably in combination with heating due to the contact resistance between the electrode portion 17 and the resistance element, causes the resistance element 14 to rapidly lose its mechanical strength, so that it yields or may actually disintegrate, and the electrode portion 17 quickly and easily pierces through the resistance element 14 under the force of the spring 11, so that the contact member 9 is moved into engagement with the stationary contact 5, completing a bypass circuit around the capacitor 20 to protect it and at the same time bypassing the gap device 13 to extinguish the arc. The extending electrode portion 17 passes through the central opening 6 of the contact member 5 and its end extends out of the bottom of the protective device, thus giving a reliable and easily observed indication that the device has operated.

It is to be noted that after the gap device 13 has arced over, the bypass circuit is not interrupted during operation of the protective device, since current flows continuously through the gap and resistance element 14 until the contact members 5 and 9 engage, and the current then transfers to the contact members without interruption of the circuit. This is an important feature of the invention since the capacitor is continuously protected after the gap arcs over.

The characteristics of the resistance element 14 are such that it yields, or disintegrates, very rapid on high fault currents, protecting the capacitor in a small fraction of a second, and preventing damage to the gap. On lower currents, the resistance element yields more slowly, so that the device has desirable inverse time characteristics, and does not operate on moderate transient overvoltages of such short duration that the capacitor is not endangered.

After operation, the capacitor is, of course, bypassed by the protective device, and the contact members of the protective device are made capable of carrying the line current continuously. In order to restore the capacitor to service, the protective device 1 must be replaced or reset. The device is easily and quickly reset by removing the retainer 19 which is threaded in the contact member 5. The remnants of the resistance element 14 are then removed and replaced by a new resistance element and the retainer 19 is replaced and screwed into the contact member 5, forcing the gap device 13 and movable electrode 9 back to their original positions shown in Fig. 1. The device is then ready for reuse.

Thus, a simple and low cost protective device is provided which is suitable for the protection of relatively small, low voltage series capacitors, and which makes the use of such capacitors possible without excessive cost for protection. The device is relatively simple and is capable of a large number of operations since it can easily be reset after each operation merely by replacing the small and inexpensive resistance element 14.

The protective device 1 described above is suitable for use with relatively low voltage capacitors, such as capacitors having voltage ratings up to 575 volts, and where the expected fault currents are not too high. For higher voltages and higher fault currents, the construction shown in Fig. 3 may be used. The protective device 25 shown in this figure is suitable for the protection of capacitors of relatively high voltage ratings, which may be as high as 4160 volts, and is capable of carrying fault currents of several thousand amperes.

The protective device 25 is enclosed in an insulating housing 26, preferably of porcelain, although other rigid, weather-resistant insulating materials might be used. The top of the housing 26 is closed by a metal top casting 27, which may be cemented to the housing 26 as indicated at 28. A terminal stud 29 is mounted on the top casting 27 and may be provided with a suitable terminal clamp 30. An annular bottom casting 31 is mounted on the bottom of the housing 26, preferably by cementing as indicated at 32, and the bottom of the housing 26 is closed by a metal plate 33 which may be bolted or otherwise secured to the bottom casting 31. The bottom plate 33 has a central opening and serves as a stationary contact member. A terminal stud 34 provided with a terminal clamp 35 is mounted on the plate 33.

A movable contact member is provided within the housing 26. The movable contact member is shown as consisting of a tubular copper member 36 which may be provided with a contact ring 37 at its lower end. The top of the tubular contact member 36 is closed by a copper top plate 38, and a compression spring 39 engages the top plate 38 and the inside of the top casting 27 to urge the movable contact member into engagement with the stationary contact plate 33. A shunt 40 is preferably provided connecting the plate 38 to the top casting 27. A fiber guide member 41 may be attached to the top casting 27 and a guide pin 42 is mounted in the top plate 38 extending into a central opening in the guide member 41 to guide the movement of the movable contact member 36.

The contact members 36 and 33 are normally held apart, in the position shown in the drawing, by spacing means which includes a spark gap device 43 and a support member or resistance element 44. The spark gap device 43 is disposed within the movable contact member 36 and has an upper electrode 45 and a lower electrode 46, both of which are preferably made of graphite. The upper electrode 45 may be of inverted cup-shape, as shown, and is mounted on, or conductively secured to, the plate 38. A fiber tube 47 is secured to the plate 38, surrounding the electrode 45, to enclose the gap and to support the lower electrode 46. The lower electrode 46 is mounted in a metal electrode member 48 which is threaded in a supporting plate 49 secured in the bottom of the insulating tube 47. The electrode member 48 can be adjusted in position, to adjust the spacing between the electrodes 45 and 46, and thus the gap breakdown voltage, by screwing the electrode member 48 in or out in the plate 49, a lock nut 50 being provided to lock the electrode in its adjusted position.

The electrode member 48 has an elongated extending portion 51 which engages the support member 44. The support member 44 is preferably a disc of resistance material, and is preferably made of the same material as the resistance element 14 described above, so that it has the same characteristics. The resistance element 44 is mounted on the contact plate 33 and may be supported in a centering element 52 threaded in the central opening of the plate 33. The resistance element 44 is held in position by an annular retainer member 53 threaded on the centering element 52. A tubular fiber guide member 54 may also be provided in the centering element 52 to guide the axial movement of the electrode portion 51.

It will be seen that the operation of this device is essentially the same as that of the protective device of Fig. 1, previously described. The protective device 25 is connected directly across the capacitor to be protected, and under normal conditions, the contact members 33 and 36 are held apart by the gap device 43 which is supported on the supporting member or resistance element 44. Upon the occurrence of an overvoltage across the protected capacitor exceeding the breakdown voltage of the gap 43, the gap arcs over so that current flows through the device from the terminal stud 29 through the gap and resistance member 44 to the terminal stud 34. As previously explained, the resistance element 44 very rapidly loses its mechanical strength and yields so that the electrode portion 51 pierces the resistance element and the movable contact 36 is moved into engagement with the contact member 33 by the spring 39. Thus, a bypass circuit is provided around the capacitor to protect it, and the gap 43 is also bypassed to extinguish the arc. The electrode portion 51 extends out of the bottom of the device and provides a visual indication that the device has operated.

After operation, the device 25 is readily reset for further use by removing the retainer 53, inserting a new resistance element 44, and replacing the retainer 53. Thus, the operation and advantages of the protective device 25 are the same as those described above in connection with the device of Fig. 1, but the device 25 is provided with a more rugged gap device which is suitable for use on higher voltages and with higher fault currents.

It will now be apparent that a protective device has been provided which is suitable for the protection of relatively small, low voltage series capacitors because of its low cost and its simplicity. This device, therefore, makes it possible to use series capacitors in small installations which have not previously been practical because of the high cost of the only protective means which were available heretofore. Certain specific embodiments of the invention have been shown and described, for the purpose of illustration, but it will be apparent that various other modifications and embodiments are possible and are within the scope of the invention.

I claim as my invention:

1. A protective device comprising a pair of relatively movable contact members, biasing means urging said contact members into engagement, a spark gap device having spaced electrodes, a normally rigid resistance element, one of said electrodes having a portion engaging the resistance element, the gap device and resistance element being disposed to normally space the contact members apart, the resistance element comprising a body of thermoplastic material containing finely divided metal powder and being adapted to yield in response to current flow through the gap device and resistance element to permit the contact members to move into engagement with each other.

2. A protective device for series capacitors, said device comprising an insulating housing, a movable contact member in the housing, a stationary contact member supported on the housing, biasing means urging the movable contact member into engagement with the stationary contact member, a normally rigid resistance element supported in fixed position in the housing in conductive relation with one of said contact members, and a spark gap device having spaced electrodes, one of the electrodes having a terminal portion engaging the other of said contact members and the other electrodes having a terminal portion engaging said resistance element to normally hold the contact members apart, the resistance element comprising a body of thermoplastic material containing finely divided metal powder and being adapted to yield in response to current flow through the gap device and resistance element to permit the contact members to move into engagement with each other.

3. A protective device for series capacitors, said device comprising an insulating housing, a movable contact member in the housing, a stationary contact member supported on the housing, biasing means urging the movable contact member into engagement with the stationary contact member, the stationary contact member having a central opening, a normally rigid resistance element supported on the stationary contact member and closing the opening, and a spark gap device having spaced electrodes, one of the electrodes having a terminal portion engaging the movable contact member and the other of the electrodes having an elongated terminal portion engaging the resistance element to normally hold the contact members apart, the resistance element being adapted to yield in response to current flow through the gap device and resistance element to permit said elongated terminal portion to pass through the opening in the stationary contact member to allow the movable contact member to move into engagement with the stationary contact member.

4. A protective device for series capacitors, said device comprising an insulating housing, a movable contact member in the housing, a stationary contact member supported on the housing, biasing means urging the movable contact member into engagement with the stationary contact member, the stationary contact member having a central opening, a normally rigid resistance element supported on the stationary contact member and closing the opening, and a spark gap device having spaced electrodes, one of the electrodes having a terminal portion engaging the movable contact member and the other of the electrodes having an elongated terminal portion engaging the resistance element to normally hold the contact members apart, the resistance element comprising a body of thermoplastic material containing finely divided metal powder and being adapted to yield in response to current flow through the gap device and resistance element to permit said elongated terminal portion to pass through the opening in the stationary contact member to allow the movable contact member to move into engagement with the stationary contact member.

5. A protective device comprising an insulating housing, a movable contact member in the housing, a stationary contact member supported on the housing, biasing means urging the movable contact member into engagement with the stationary contact member, one of said contact members having a central opening, a normally rigid resistance element supported on said one contact member and closing the opening, and a spark gap device having spaced electrodes, one of said electrodes having a terminal portion engaging the resistance element and the other of the electrodes engaging the other of said contact members to normally hold the contact members apart, the resistance element being adapted to to yield in response to current flow through the gap device to permit the terminal portion of said one electrode to pierce the resistance element to allow the movable contact member to move into engagement with the stationary contact member.

6. A protective device comprising an insulating housing, a movable contact member in the housing, a stationary contact member supported on the housing, biasing means urging the movable contact member into engagement with the stationary contact member, one of said contact members having a central opening, a normally rigid resistance element supported on said one contact member and closing the opening, and a spark gap device having spaced electrodes, one of said electrodes having a terminal portion engaging the resistance element and the other of the electrodes engaging the other of said contact members to normally hold the contact members apart, the resistance element comprising a body of thermoplastic material containing finely divided metal powder and being adapted to yield in response to current flow through the gap device to permit the terminal portion of said one electrode to pierce the resistance element to allow the movable contact member to move into engagement with the stationary contact member.

References Cited in the file of this patent

UNITED STATES PATENTS

| | | |
|---|---|---|
| 1,201,646 | Steinmetz | Oct. 17, 1916 |
| 1,458,611 | Brach | June 12, 1923 |
| 1,977,191 | Levenstein | Oct. 16, 1934 |
| 2,277,222 | Goldner | Mar. 24, 1942 |
| 2,295,320 | Allen | Sept. 8, 1942 |
| 2,469,215 | Smith | May 3, 1949 |
| 2,546,824 | Koliss | Mar. 27, 1951 |
| 2,619,518 | Kelsay | Nov. 25, 1952 |